(12) United States Patent
Kawamura et al.

(10) Patent No.: US 7,948,858 B2
(45) Date of Patent: *May 24, 2011

(54) OPTICAL INFORMATION PROCESSING APPARATUS, OPTICAL PICK-UP DEVICE AND OPTICAL RECORDING DISC SYSTEM

(75) Inventors: Tomoto Kawamura, Tokyo (JP); Sayako Itoh, Kamakura (JP); Daisuke Tomita, Yokohama (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 185 days.

This patent is subject to a terminal disclaimer.

(21) Appl. No.: 12/369,195

(22) Filed: Feb. 11, 2009

(65) Prior Publication Data

US 2009/0147661 A1 Jun. 11, 2009

Related U.S. Application Data

(63) Continuation of application No. 11/193,436, filed on Aug. 1, 2005, now Pat. No. 7,502,303.

(30) Foreign Application Priority Data

Nov. 10, 2004 (JP) .................. 2004-325814

(51) Int. Cl.
*G11B 7/00* (2006.01)
(52) U.S. Cl. ....................................................... 369/116
(58) Field of Classification Search .................. 369/120, 369/121, 122, 116, 44.23, 44.24, 44.42, 112.1, 369/112.28, 47.5, 47.52, 47.51
See application file for complete search history.

(56) References Cited

U.S. PATENT DOCUMENTS

| 4,896,543 | A | 1/1990 | Gullman |
| 5,290,972 | A | 3/1994 | Someya |
| 5,475,210 | A | 12/1995 | Taguchi et al. |
| 6,346,695 | B2 | 2/2002 | Yanagawa |
| 6,510,119 | B2 | 1/2003 | Takeshita |
| 7,177,259 | B2 | 2/2007 | Nishi |
| 7,177,260 | B2 * | 2/2007 | Kim et al. ................ 369/112.28 |
| 7,298,688 | B2 | 11/2007 | Kim |
| 2001/0048063 | A1 | 12/2001 | Yanagawa et al. |

FOREIGN PATENT DOCUMENTS

| EP | 285773 | 12/1988 |
| EP | 1503189 | 2/2005 |
| GB | 2301896 | 12/1996 |
| JP | 6-267100 | 9/1994 |

(Continued)

*Primary Examiner* — Nabil Z Hindi
(74) *Attorney, Agent, or Firm* — Antonelli, Terry, Stout & Kraus, LLP.

(57) ABSTRACT

An optical pick-up device includes a laser source enabling emission of at least two light beams with different wavelengths, an objective lens which focuses the light beams emitted from the laser source on an optical disc, an optical detector which receives a light reflected from the optical disc, a front monitor which receives a part of the light beams emitted from the laser source, a front monitor light-guiding plate which guides part of the light beams emitted from the laser source to the front monitor. The front monitor light-guiding plate is arranged between the laser source and the objective lens, at least a part of a region of the front monitor light-guiding plate illuminated by the light beams emitted from the laser source has a predetermined shape which causes the light beams to change traveling direction thereof by refraction and then be guided to the front monitor.

7 Claims, 9 Drawing Sheets

FOREIGN PATENT DOCUMENTS

| | | |
|---|---|---|
| JP | 8-36797 | 2/1996 |
| JP | 11-273119 | 10/1999 |
| JP | 2000-100069 | 7/2000 |
| JP | 2001-184709 | 7/2001 |
| JP | 2002-358156 | 12/2002 |
| JP | 2003-77170 | 3/2003 |
| JP | 2004-227680 | 8/2004 |
| JP | 2005-18955 | 1/2005 |

\* cited by examiner

FIG.9

OPTICAL INFORMATION PROCESSING APPARATUS, OPTICAL PICK-UP DEVICE AND OPTICAL RECORDING DISC SYSTEM

CROSS REFERENCE TO RELATED APPLICATION

This application is a continuation application of U.S. application Ser. No. 11/193,436, filed Aug. 1, 2005, now U.S. Pat. No. 7,502,303, the contents of which are incorporated herein by reference.

INCORPORATION BY REFERENCE

The present application claims priority from Japanese application JP 2004-325814 filed on Nov. 10, 2004, the content of which is hereby incorporated by reference into this application.

BACKGROUND OF THE INVENTION

The present invention relates to a technical field concerning optical information processing.

In recent years, optical disc drives capable of recording information on and reproducing the information from CD-R/RW (Compact Disc-Recordable/Rewritable), DVD-R/RW (Digital Versatile Disc-Recordable/Rewritable), or the like have become widely spread. In the optical disc drive, in order to record the information, a light beam is irradiated onto an optical disc by an optical pick-up device contained in the optical disc drive. Then, in order to read the information, the light beam reflected from the optical disc is detected by the optical pick-up device.

In order to perform stable recording and reproduction processing during the recording and reproduction of the information by the optical pick-up device, it is necessary to accurately control the light amount of the light beam irradiated onto the optical disc. For this reason, the optical pick-up device has a unit for detecting the light amount of the light beam emitted from a laser diode. By feedbacking the detected light amount to the laser diode, the light amount of the light beam irradiated onto the optical disc is accurately controlled.

In order to detect the light amount of the light beam emitted from the laser diode, it is a common practice to provide a light reception element that receives a part of the light beam emitted forward from the laser diode. Herein, the light reception element that receives the light beam emitted forward from the chip of the laser diode will be referred to as a "front monitor".

Various units for guiding the light beam from the laser diode to the front monitor are known.

Among these, an optical pick-up device disclosed in FIG. 1 of JP-A-2001-184709, for example, has a configuration in which a light beam is emitted from a laser diode, and a part of the emitted light beam outside the effective diameter of an objective lens is detected by a front monitor.

In this configuration, the light beam outside the effective diameter of the objective lens is monitored. Thus, it is possible to avoid a problem that a light amount detected by the front monitor is greatly varied. This problem occurs due to interference between the light beam emitted from the laser diode and a light beam reflected from the optical disc on the detection surface of the front monitor.

An optical pick-up device disclosed in FIG. 1 of JP-A-2003-77170, for example, has a configuration in which a diffraction element is arranged between an objective lens and a laser diode, so that the light amount of the light beam outside the effective diameter of an objective lens is led more to the front monitor.

SUMMARY OF THE INVENTION

In recent years, in order to support high-speed recording in CD and DVD, it is necessary to mount the high-power laser diode in the optical pick-up device. When the optical output of the high-power laser diode is increased, the center of the optical axis of the laser diode may be inclined. When the center of the optical axis is inclined in the optical pick-up device as disclosed in JP-A-2001-184709, which detects a part of the light beam outside the effective diameter of the objective lens by the front monitor, the amount of light detected by the front monitor will be greatly varied, for example, even with the amount of light irradiated onto the optical disc practically unchanged. The amount of the light thus cannot be monitored accurately.

On the other hand, in the configuration that uses the diffraction element as disclosed in JP-A-2003-77170, in addition to a light beam having a predetermined angle, a light beam having a diffraction angle other than the predetermined diffraction angle is also generated by the diffraction element. This light beam may become a stray light, and may enter into a detector or the like for detecting an information signal, thereby hindering high-accuracy signal reproduction. For this reason, countermeasures against the stray light are required for each of the optical pick-up devices that have been mass produced. Improvement in the yield of the optical pick-up devices is thereby hindered.

An object of the present invention is therefore to downsize an optical information processing apparatus or reduce the circuit size of the optical information processing apparatus. The above-mentioned object is achieved by the invention defined in claims, so that downsizing the optical information processing apparatus or reduction in the circuit size of the optical information processing apparatus can be achieved.

BRIEF DESCRIPTION OF THE DRAWINGS

These and other features, objects and advantages of the present invention will become more apparent from the following description when taken in conjunction with the accompanying drawing wherein.

DETAILED DESCRIPTION OF THE EMBODIMENTS

A best mode for carrying out the present invention will be described in the order of first through sixth embodiments.

In the first embodiment, a description will be directed to an optical pick-up device that supports an optical disc drive capable of performing recording on and reproduction from a DVD.

Figure 1:
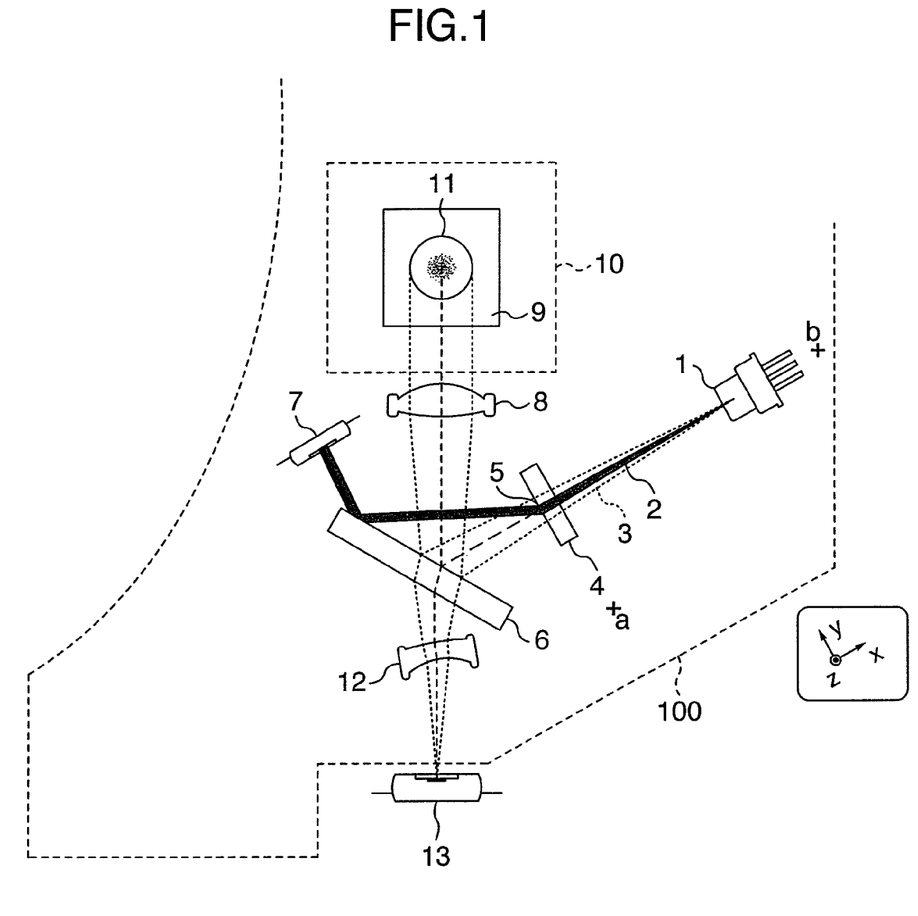
FIG. 1 is a diagram showing a configuration of an optical system of an optical pick-up device in a first embodiment.

FIG. 1 is a diagram showing an optically devised configuration including an optical pick-up device 100. A light beam is emitted from a laser diode 1 as diverged beams. In order to perform information recording on or information reproduction from a DVD optical disc, it is a common practice to employ a semiconductor laser with a wavelength of approximately 660 nm. As the laser diode 1 as well, the semiconductor laser that emits a light beam with a wavelength of approximately 660 nm is assumed. It is also assumed that a laser chip active layer in the laser diode 1 is parallel to a plane formed by x and y axes in FIG. 1. Further, a light path indicated by cross hatching in FIG. 1 represents a light beam 2, while a light path indicated by a chain line represents a light beam 3.

First, the light beam 2 will be described. The light beam 2 emitted from the laser diode 1 enters a front monitor light-guiding plate 4, which is a transparent substrate. In the front monitor light-guiding plate 4, a region 5 with light incident and emergent surfaces thereof set at predetermined angles, respectively, is formed. The light beam 2, which has entered into the region 5 in the front monitor light-guiding plate 4, exits the front monitor light-guiding plate 4 at a predetermined angle by refraction. The light beam 2 which has exited the front monitor light-guiding plate 4 is reflected at a beam splitter 6 once, and then enters into a front monitor 7.

In the optical disc drive, when a signal is recorded on the optical disc, a predetermined amount of light is irradiated onto the optical disc, as described before. Accordingly, it is necessary to accurately control the amount of light emitted from the laser diode. The front monitor 7 is thus mounted to detect a change in the amount of the light from the laser diode 1 and control the amount of the light emitted from the laser diode 1. The output signal of the front monitor 7 is fed back to a driving circuit (not shown) for the laser diode 1. The output signal thus can control the amount of the light emitted from the laser diode 1, so that a desired amount of light can be irradiated onto the optical disc.

Next, the light beam 3 will be described. The light beam 3 emitted from the laser diode 1 enters the front monitor light-guiding plate 4. In a region different from the region 5 in the front monitor light-guiding plate 4, grating grooves are formed. The light beam 3 is branched into three beams through the grating grooves, for use in detecting a tracking error signal (hereinafter referred to as a TES) for the optical disc through a differential push-pull method (hereinafter referred to as a DPP method). Since the DPP method is a very common method of detecting the TES, its description will be omitted. The light beam 3 that has passed through the front monitor light-guiding plate 4 reflects from the beam splitter 6. Then, the light beam 3 is guided to a collimating lens 8, through which the light beam 3 is converted into generally parallel light beams. The generally parallel light beams converted from the light beam 3 exit the collimating lens 8, reflect from a reflection mirror 9 in the positive direction of a z axis shown in FIG. 1, and are focused on the optical disc (not shown) through an objective lens 11 mounted on an actuator 10.

The light beam 3 is reflected from the optical disc and reaches an optical detector 13 through the objective lens 11, reflection mirror 9, collimating lens 8, beam splitter 6, and a detecting lens 12. When the light beam 3 passes through the beam splitter 6, the light beam 3 is given predetermined astigmatism and is used for detecting a focusing error signal (hereinafter referred to as an FES) for the optical disc through an Astigmatic Detection method. Since the Astigmatic Detection method is a very common method of detecting the FES, its description will be omitted. The detecting lens 12 functions to turn the direction of the astigmatism in a predetermined direction and also functions to determine the size of a light spot on the optical detector 13. The light beam 3 guided to the optical detector 13 is used for detection of an information signal recorded on the optical disc and detection of position control signals such as the TES and the FES for a light spot focused on the optical disc.

Figure 2:
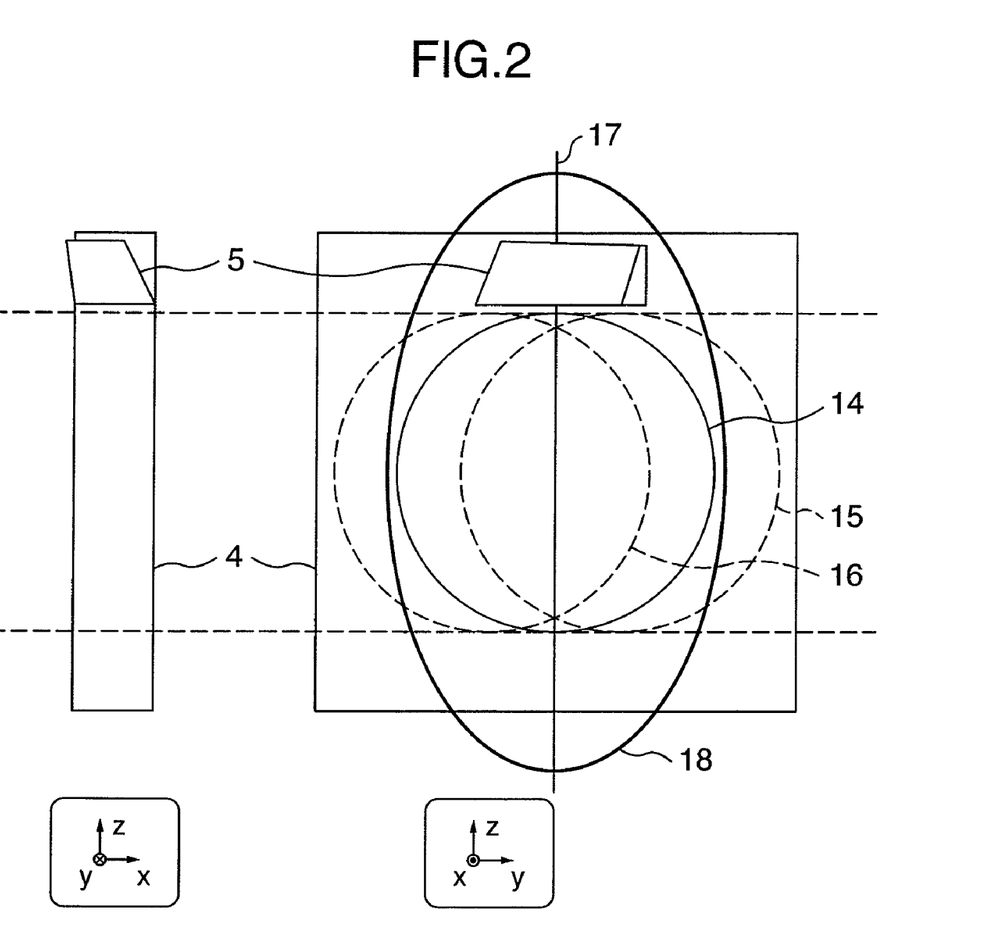
FIG. 2 is a schematic diagram showing a configuration of a front monitor light-guiding plate in the first embodiment.

FIG. 2 is a schematic diagram showing a configuration of the front monitor light-guiding plate 4. The front monitor light-guiding plate 4 will be described in detail with reference to FIG. 2. A drawing on the left shows the front monitor light-guiding plate 4 seen from a point a in FIG. 1, while a drawing on the right shows the front monitor light-guiding plate 4 seen from a point b in FIG. 1.

In the front monitor light-guiding plate 4, the region 5 is formed. The region 5 has the light incident and emergent set at the predetermined angles. The light incident is set at the predetermined angles with respect to the y and z axes, respectively. The light emergent surface is also set at the predetermined angles with respect to the y and z axes, respectively. By setting the surface shapes of the light incident and emergent surfaces the region 5 at the predetermined angles as described above, the light beam 2 that has passed through the region 5 of the front monitor light-guiding plate 4 is guided to the front monitor 7 by refraction.

A circle 14 in the right drawing indicates a region in the front monitor light-guiding plate 4 illuminated by the light beam 3 within the effective diameter of the objective lens 11. When predetermined positional information on the optical disc is recorded or reproduced, the objective lens 11 is moved in the radial direction of the optical disc, for use. For this reason, the region of the front monitor light-guiding plate 4 illuminated by the light beam, such as a circle 15 or a circle 16 indicated by a broken line is wide in the positive and negative directions of the y axis. In optical recording disc systems in recent years, in order to increase the speed of recording, not only the power of the laser diode but also the optical efficiency with which a light beam is guided to the optical disc must be increased. For this purpose, the region 5 of the front monitor light-guiding plate 4 is arranged outside the region illuminated by the light beam 3 within the effective diameter of the objective lens 11. Since the light beam 2 outside the effective diameter of the objective lens is used as described above, the optical efficiency with which the light beam is guided to the optical disc will not be reduced.

Further, the light beam emitted from the laser diode generally has an elliptical intensity distribution in a longitudinal direction orthogonal to the laser chip active layer of the laser diode, an elliptical intensity distribution 18 as shown in a dotted line in the right drawing is obtained. For this reason, the region 5 of the front monitor light-guiding plate 4 is so arranged as to cross a straight line (a line 17 in the drawing) passing through the center of the light beam 3 and perpendicular to the laser chip active layer of the laser diode. With this arrangement, the amount of light that reaches the front monitor 7 is increased, so that a signal having a good SN (signal to noise ratio) can be obtained.

The front monitor light-guiding plate 4 is arranged in the light path between the laser diode 1 and the objective lens 11, and the grating grooves are formed in the region of the front monitor light-guiding plate 4 illuminated by the light beam 3 within the effective diameter of the objective lens 11. With this arrangement, the front monitor light-guiding plate 4 also has a function comparable to that of an ordinary diffraction grating. Thus, without arranging the front monitor light-guiding plate and the diffraction grating separately, as in JP-A-2001-184709, two types of functions can be incorporated into only one component. Downsizing can be thereby achieved, and low cost due to reduction of an assembly time as well as a decrease in the number of components can also be achieved.

Further, in this embodiment, the light beam is guided to the front monitor by refraction. Thus, compared with a configuration as disclosed in JP-A-2003-77170, in which the light beam is guided to the front monitor by diffraction, measures against a stray light are not required.

Still further, by setting the light incident and emergent surfaces of the region 5 of the front monitor light-guiding plate 4 at the predetermined angles, greater mounting latitude in the arrangement of the front monitor 7 is achieved.

In the optical recording disc system, higher reflectivity and transmittivity of the beam splitter 6 are required. The higher reflectivity is required for increasing the power for irradiating a light beam onto the optical disc. The higher transmittivity is required for improving the SN of the optical detector. A special film is formed on the surface of the beam splitter 6 so that the beam splitter 6 has special reflection and transmission characteristics. Preparation of such a special film, however, is very difficult, and depending on the film, the reflection and transmission characteristics would greatly vary. For this reason, when the reflectivity of the beam splitter 6 is reduced in a conventional optical recording disc system, the amount of light on the optical disc is reduced though the amount of light on the front monitor remains unchanged. Thus, in the present invention, the front monitor 7 is arranged in a position that is more ahead in the traveling direction of the light beam 2 than the beam splitter 6. With this arrangement, the amount of the light detected by the front monitor will not depend on the reflection and transmission characteristics of the beam splitter 6.

Figure 10:
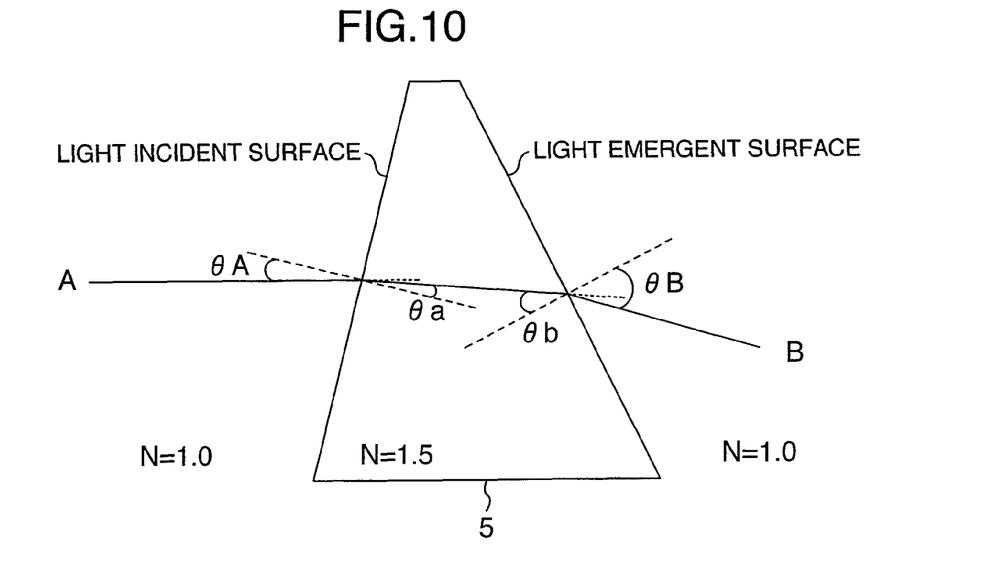
FIG. 10 shows a state in which a light beam changes its traveling direction in a region of a front monitor light-guiding plate of the optical system.

FIG. 10 shows a state in which the light beam changes its traveling direction in the region 5 of the front monitor light-guiding plate 4 by refraction. The light beam enters into the region 5 from a point A in FIG. 10. The light incident surface is arranged inclined by a predetermined angle θA with respect to the light beam. The light beam passes through the region 5, being inclined by an angle θa different from the angle θA in accordance with the Snell's law. The light emergent surface is arranged inclined by an angle θb with respect to the light beam that enters the light emergent surface. The light beam exits the region 5, being inclined by an angle θB different from the angel θb in accordance with the Snell's law. The light beam that has entered into the region 5 from the point A exits the region 5, being inclined by the angle different from the original angle. By setting the light incident and emergent surfaces arbitrarily, the light beam inclined by an arbitrary angle can be obtained. The present invention utilizes such a refraction phenomenon and guides the light beam outside the effective diameter of the objective lens to the front monitor 7 through the front monitor light-guiding plate 4.

In the first embodiment, a description was directed to the optical pick-up device that supports the optical disc drive that can perform recording on and reproduction from the DVD. The optical pick-up device that supports the optical disc drive capable of performing recording on and reproduction from media such as a CD, BD (Blu-ray Disc), and HD-DVD (High Definition-DVDs)can also be used. The optical pick-up device can be used as the optical pick-up device for the CD, BD, HD-DVD. The optical pickup device can be of course used as the compatible optical pick-up device for light beams of a plurality of wavelengths, such as a two-wavelength compatible optical pickup device for the CD and the DVD or a three-wavelength compatible optical pickup device for the BD, DVD, and CD.

In the second embodiment, a description will be directed to an optical pick-up device that supports the optical disc drive capable of performing recording on and reproduction from the DVD. The optical pick-up device in the second embodiment is different from the optical pick-up device 100 in the first embodiment in the structure of the front monitor light-guiding plate 4. Since the optical pick-up device in the second embodiment is the same as the optical pick-up device 100 except for the front monitor light-guiding plate 4, a detailed description of the optical pick-up device will be omitted.

Figure 3:
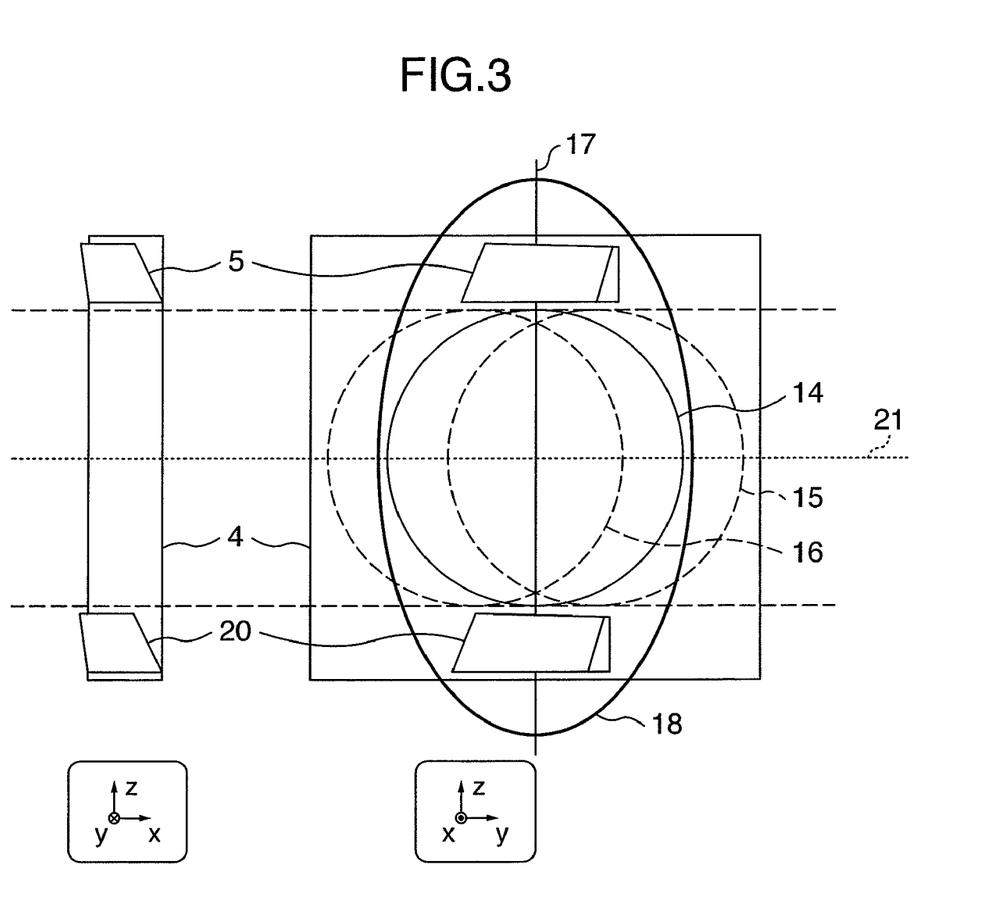
FIG. 3 is a schematic diagram showing a configuration of a front monitor light-guiding plate in a second embodiment.

FIG. 3 is a schematic diagram showing the front monitor light-guiding plate 4 in the second embodiment. The front monitor light-guiding plate 4 in the second embodiment is different from the front monitor light-guiding plate 4 in the first embodiment in that a region 20 is formed. The region 20 has the light incident and emergent surfaces set at predetermined angles. The light incident surface is set at the predetermined angles with respect to the y and z axes, respectively. The light emergent surface is also set at the predetermined angles with respect to the y and z axes, respectively. The angles at which the light incident and emergent surfaces are set in the area 20 are different from those in the region 5. By setting the surface shapes of the light incident and emergent surfaces of the region 20 at the predetermined angles, the light beam 2 that has passed through the region 20 of the front monitor light-guiding plate 4, is also guided to the front monitor 7 by refraction.

In the second embodiment, the light beam emitted from the laser diode 1 is guided to the front monitor 7 from the two regions 5 and 20 in the front monitor light-guiding plate 4. Thus, the amount of light that reaches the front monitor 7 is doubled compared with that in the first embodiment.

Further, like the region 5, the region 20 of the front monitor light-guiding plate 4 is arranged outside the region illuminated by the light beam 3 within the effective diameter of the objective lens. Since the region 20 also uses the light beam outside the effective diameter of the objective lens, the optical efficiency with which the light beam is guided to the optical disc will not be reduced.

Further, the light beam of the laser diode has generally the elliptical intensity distribution 18 in the longitudinal direction orthogonal to the laser chip active layer. For this reason, the region 20 of the front monitor light-guiding plate 4 is also so arranged as to cross the straight line (the line 17 in the drawing) passing through the center of the light beam 3 and perpendicular to the laser chip active layer of the laser diode. With this arrangement, the amount of the light that reaches the front monitor 7 is increased, so that a signal with a good SN (signal to noise ratio) can be obtained.

As described before, in recent years, when the optical output of the high-power laser diode for supporting high-speed recording on the CDs and the DVDs is increased, the center of the optical axis of the laser diode may be inclined. When the center of the optical axis is inclined in the optical pick-up device as disclosed in JP-A-2001-184709, which detects a part of the emitted light beam outside the effective diameter of the objective lens by the front monitor, the amount of light detected by the front monitor will be greatly varied, though the amount of light irradiated onto the optical disc remains unchanged. The amount of the light thus cannot be detected accurately. This problem arises for the following reason: A light beam irradiated onto the optical disc through the objective lens has an intensity peak in the center of the optical axis of the light beam. Thus, even if the optical axis is inclined to a certain extent within the effective diameter of the objective lens, a change in power emitted to the optical disc is not great. However, the light beam guided to the front monitor uses the part of the emitted light beam outside the effective diameter of the objective lens. Accordingly, when the center of the optical axis is inclined, a change in the position of the intensity distribution of the light beam will directly be reflected on the amount of the light detected by the front monitor. Accordingly, the amount of the light detected by the front monitor will be greatly varied.

For this reason, in the second embodiment, the region 20 of the front monitor light-guiding plate 4 is arranged opposite to the region 5 with respect to a straight line (a line 21 in the drawing) parallel to the laser chip active layer in the laser diode 1. When the regions 5 and 20 are arranged as described above, and when the center of the optical axis is inclined and the amount of light that reaches the front monitor 7 from the region 5 is greatly reduced, the amount of light that reaches the front monitor 7 from the region 20 is greatly increased. The amount of the light detected by the front monitor 7 can be thereby made to be scarcely changed. In other words, a change caused by inclination of the optical axis can be limited to be a small one.

In the third embodiment, a description will be directed to an optical pick-up device that supports the optical disc drive capable of performing recording on and reproduction from the DVDs.

Figure 4:
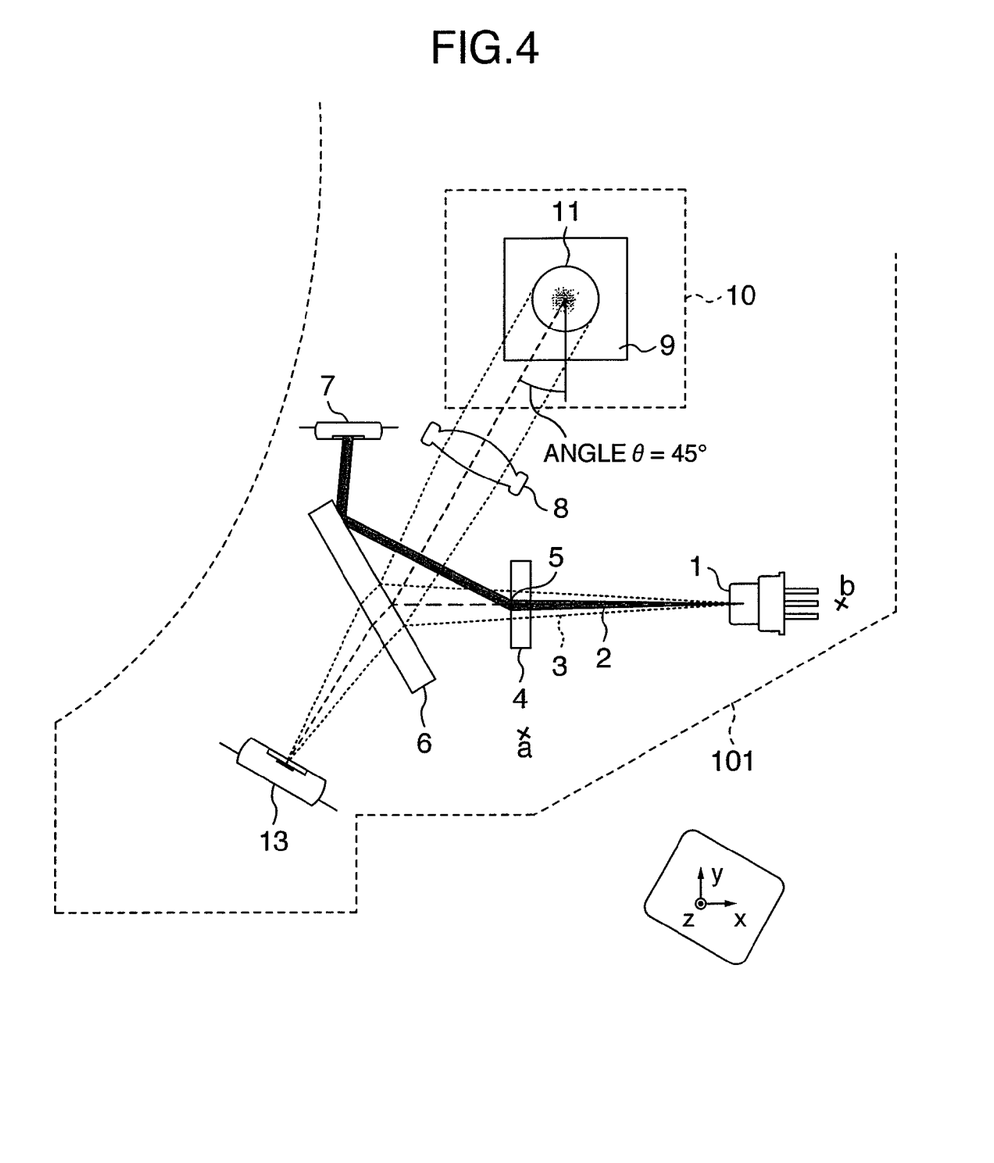
FIG. 4 is a diagram showing a configuration of an optical system of an optical pick-up device in a third embodiment.

FIG. 4 is a diagram showing an optical system configuration of an optical pick-up device 101 in the third embodiment. The optical pick-up device 101 in the third embodiment is different from the optical pick-up device 100 in the first embodiment in that all of optical components are rotated by 45 degrees around the z axis with respect to the center of the objective lens.

First, the optical system of the optical pick-up device 101 will be described. A light beam is emitted from a laser diode 1 as diverged lights. As in the case of the optical pick-up device 100, the semiconductor laser that emits the light beam with a wavelength of approximately 660 nm is assumed to be used as the laser diode 1. It is also assumed that the laser chip active layer in the laser diode 1 is parallel to a plane obtained by rotating the plane formed by x and y axes in FIG. 4 by 45 degrees counterclockwise with respect to the x axis. Further, a light path indicated by cross hatching in FIG. 4 represents the light beam 2, while a light path indicated by a chain line represents the light beam 3.

First, the light beam 2 will be described. The light beam 2 emitted from the laser diode 1 enters into front monitor light-guiding plate 4, which is the transparent substrate. In the front monitor light-guiding plate 4, the region 5 is formed. The region 5 has the light incident and emergent surfaces set at predetermined angles, respectively. The light beam 2, which has entered into the region 5 in the front monitor light-guiding plate 4, exits the front monitor light-guiding plate 4 at a predetermined angle by refraction. The light beam 2 which has exited the front monitor light-guiding plate 4 reflects from the beam splitter 6 once, and then enters the front monitor 7.

Since all of the optical components are rotated around the z axis with respect to the center of the objective lens, the configuration of the front monitor light-guiding plate 4 of the optical pick-up device 101 becomes different from the configuration of the front monitor light-guiding plate 4 of the optical pick-up device 100. The front monitor light-guiding plate 4 in this embodiment will be described later in detail using FIG. 5.

Next, the light beam 3 will be described. The light beam 3 emitted from the laser diode 1 enters the front monitor light-guiding plate 4. In a region different from the region 5 in the front monitor light-guiding plate 4, the grating grooves are formed. The light beam 3 is branched into three beams through the grating grooves, for use for detecting the TES for an optical disc through the DPP method. The light beam 3 that has passed through the front monitor light-guiding plate 4 reflects from the beam splitter 6. Then, the light beam 3 is guided to the collimating lens 8, through which the light beam 3 is converted into generally parallel light beams. The generally parallel light beams converted from the light beam 3, which have exited the collimating lens 8, reflect from the reflection mirror 9 in the positive direction of the z axis shown in FIG. 4, and are focused on the optical disc (not shown) through the objective lens 11 mounted on the actuator 10.

The light beam 3 is reflected from the optical lens and reaches the optical detector 13 through the objective lens 11, reflection mirror 9, collimating lens 8, and beam splitter 6. When the light beam 3 passes through the beam splitter 6, the light beam 3 is given predetermined astigmatism and is used for detecting the FES for the optical disc using the Astigmatic Detection method. In the optical pick-up device 101, the overall optical system is inclined by 45 degrees around the z axis, and the laser chip active layer in the laser diode 1 is made parallel to the plane obtained by rotating the plane formed by the x and y axes in FIG. 4 by 45 degrees counterclockwise with respect to the x axis. The detecting lens 12 can be thereby eliminated. The light beam 2 guided to the optical detector 13 is used for detection of an information signal recorded on the optical disc and detection of the position control signals such as the TES and the FES for a light spot converged on the optical disc.

Figure 5:
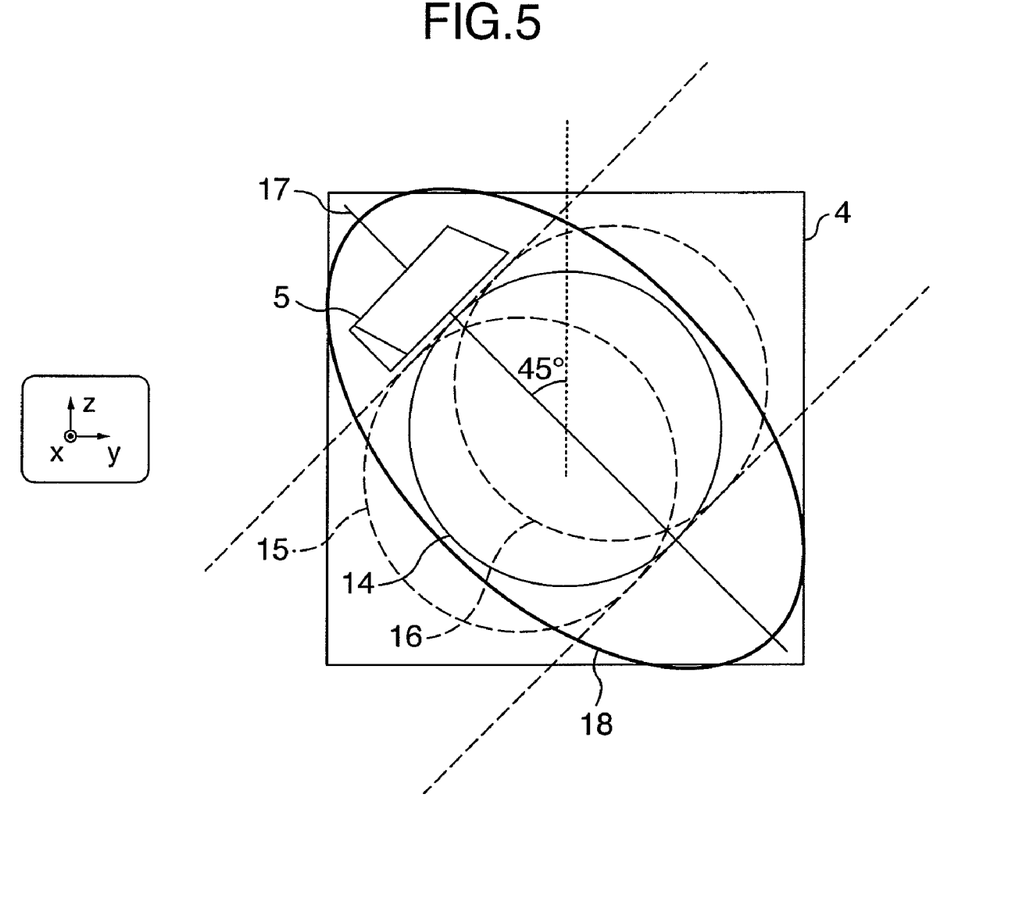
FIG. 5 is a schematic diagram showing a configuration of a front monitor light-guiding plate in the third embodiment.

FIG. 5 is a schematic diagram showing a configuration of the front monitor light-guiding plate 4 in the third embodiment. Using this drawing, the front monitor light-guiding plate 4 will be described in detail. FIG. 5 shows the front monitor light-guiding plate 4 seen from a point b in FIG. 4. The front monitor light-guiding plate 4 in the third embodiment is different from the front monitor light-guiding plate 4 in the first embodiment in FIG. 2 in that the center of the light beam on the front monitor light-guiding plate 4 is inclined by 45 degrees counterclockwise with respect to the x axis. Further, the laser chip active layer in the laser diode 1 is made parallel to the plane obtained by rotating the plane formed by the x and y axes in FIG. 5 by 45 degrees counterclockwise with respect to the x axis. Thus, the elliptical intensity distribution in the longitudinal direction orthogonal to the laser chip active layer becomes the elliptical intensity distribution 18 as indicated by a dotted line in FIG. 5. The region 5 of the front monitor light-guiding plate 4 is arranged so as to cross the straight line (the line 17 in FIG. 5) passing through the center of the light beam 3 and perpendicular to the laser chip active layer of the laser diode. Thus, the center of the light beam on the front monitor light-guiding plate 4 in the third embodiment is inclined by 45 degrees counterclockwise with respect to the x axis. With this arrangement, the amount of light that reaches the front monitor 7 is increased, so that a signal with a good SN (signal to noise ratio) can be obtained.

The angles at which the light incident and emergent surfaces the region 5 are set are of course different from those in FIG. 2, and the light incident and emergent surfaces are set at desired angles so that the light beam reaches the front monitor 7.

As the front monitor light-guiding plate 4 of the optical pick-up device 101, the front monitor light-guiding plate 4 shown in FIG. 3 can also be used. In this case, by inclining the center of the light beam on the front monitor light-guiding plate 4 in FIG. 3 by 45 degrees counterclockwise with respect to the x axis, the same effect as that described in the second embodiment can be obtained.

When the optical recording disc system is mounted in personal computers of a notebook type for mobile use, which have become popular in recent years, the thinner optical recording disc system is preferable due to convenience for portability. When the optical recording disc system is mounted in the notebook type personal computer, by inclining the front monitor light-guiding plate 4 in an optical axis direction as shown in FIG. 5, the thickness of the optical components therein can also be reduced in the thickness direction of the optical pick-up device.

In the fourth embodiment, a description will be directed to an optical pick-up device that supports an optical disc drive that can perform recording on and reproduction from the DVD and CD.

Figure 6:
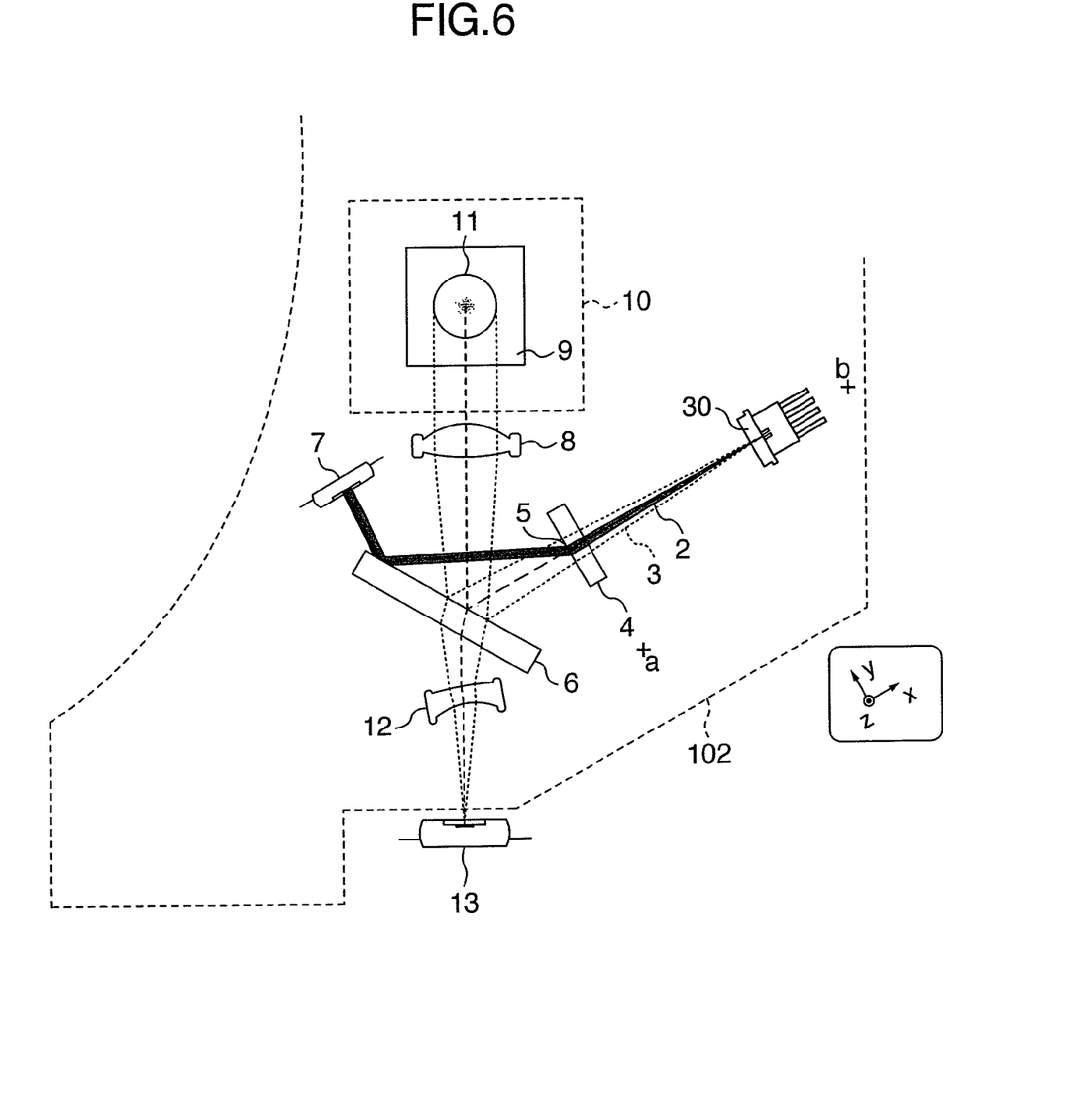
FIG. 6 is a diagram showing a configuration of an optical system of an optical pick-up device in a fourth embodiment.

FIG. 6 is a diagram showing a configuration of an optical system of an optical pick-up device 102. The optical pick-up device 102 in the fourth embodiment is different from the optical pick-up device 100 in the first embodiment in that a two-wavelength multi laser diode 30 is mounted and the configuration of the front monitor light-guiding plate 4 is different. The two-wavelength multi-laser diode is constituted by forming two different laser chips in one laser diode.

It is a common practice to use the semiconductor laser with a wavelength of approximately 660 nm to perform information recording on or information reproduction from DVD optical discs. It is also a common practice to use a semiconductor laser with a wavelength of 780 nm to perform information recording on or information reproduction from CD optical discs. For this reason, it is assumed that a light beam for a DVD, or a DVD light beam with a wavelength of 660 nm is emitted from the two-wavelength multi-laser diode when recording on or reproduction from the DVD optical disc is performed. It is also assumed that a light beam for a CD or a CD light beam with a wavelength of 780 nm is emitted from the two-wavelength multi-laser diode when recording on or reproduction from the CD optical disc is performed. Further, the laser chip active layer in the laser diode 30 is assumed to be parallel to a plane formed by x and y axes in FIG. 6. Each of the CD and DVD light beams emitted from the two-wavelength multi-laser diode passes through the same light path as that in the first embodiment. Thus, a description of the details of them will be omitted.

Since the DVD light beam and the CD light beam emitted from the laser diode 30 are different in wavelength, the angles of refraction of the DVD and CD light beams that have entered into the region 5 in the front monitor light-guiding plate 4 are slightly different. Accordingly, between the DVD light beam and the CD light beam, the angles set for the light incident and emergent surfaces of the region 5 in which the amount of light becomes the largest on the front monitor 7 will become different.

Figure 7:
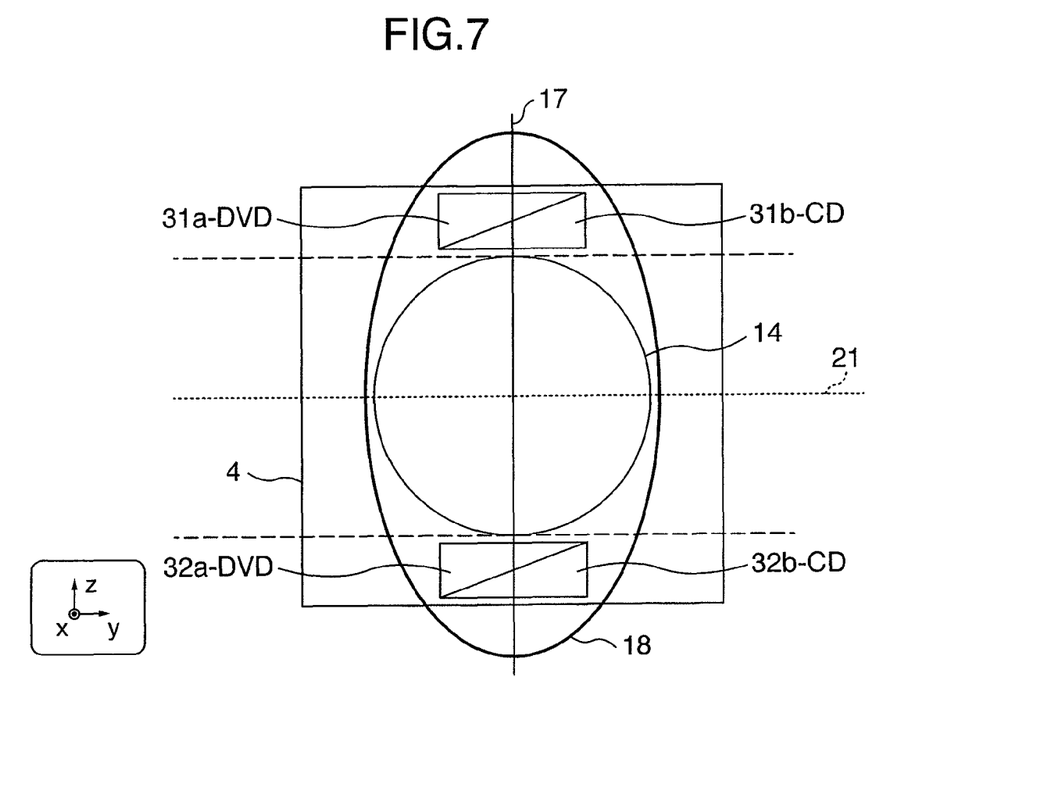
FIG. 7 is a schematic diagram showing a configuration of a front monitor light-guiding plate in the fourth embodiment.

FIG. 7 shows the configuration of the front monitor light-guiding plate 4 in the fourth embodiment. The front monitor light-guiding plate 4 in this embodiment is different from the front monitor light-guiding plate 4 in FIG. 3 in that the configurations of the regions 5 and 20 are different. The angles of the light incident and emergent surfaces of each of regions 31a and 32a are set so that the light amount of the DVD light beam becomes the largest on the front monitor 7, while the angles of the light incident and emergent surfaces of each of regions 31b and 32b are set so that the light amount of the CD light beam becomes the largest on the front monitor 7. Through the use of the front monitor light-guiding plate 4 having the configuration shown in FIG. 7, the optimum light amounts for the DVD and the CD can be respectively led to the front monitor 7. Consequently, high accuracy detection of the respective light amounts on the DVD and CD optical discs becomes possible.

Alternatively, even if the light incident and emergent surfaces of the region 5 are set at optimum angles for the DVD and the light incident and emergent surfaces of the region 20 are set at optimum angles for the CD in the configuration of the front monitor light-guiding plate 4 shown in FIG. 3, high accuracy detection of the respective light amounts on the DVD and CD optical discs becomes possible.

Alternatively, when the DVD and CD light beams having different wavelengths are guided to the front monitor 7 through the front monitor light-guiding plate 4 having the configuration in FIG. 2, the light incident and emergent surfaces of the region 5 may be set at angles intermediate between the optimum angles for the DVD and the CD.

In the fifth embodiment, a description will be directed to an optical pick-up device that supports the optical disc drive that can perform recording on and reproduction from the DVDs and the CDs.

Figure 8:
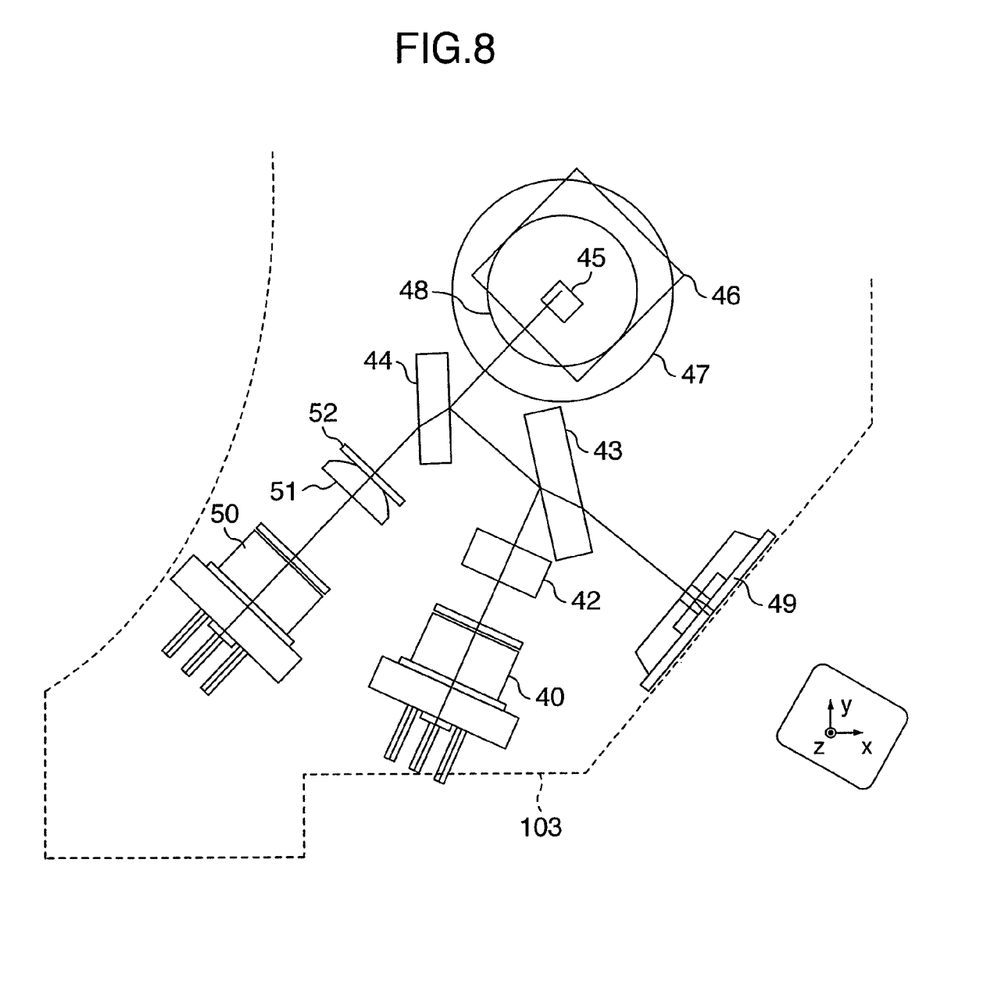
FIG. 8 a diagram showing configurations of optical systems of an optical pick-up device in a fifth embodiment.

FIG. 8 is a diagram schematically showing configurations of DVD and CD optical systems of an optical pick-up device 103.

First, the DVD optical system will be described. A DVD light beam is emitted from a DVD laser diode 40 as diverged lights. The laser diode 40 is also assumed to be the semiconductor laser that emits the light beam having a wavelength of approximately 660 nm so as to perform information recording on or information reproduction from a DVD. A laser chip active layer in the DVD laser diode 40 is assumed to be parallel to a plane obtained by inclining a plane formed by x and y axes in FIG. 8 by 45 degrees counterclockwise with respect to the optical axis of the DVD light beam.

The DVD light beam emitted from the DVD laser diode 40 enters a front monitor light-guiding plate 42. Since the laser chip active layer is inclined with respect to the optical axis, the DVD front monitor light-guiding plate is assumed to have a shape as shown in FIG. 5. In a region different from the region 5, the grating grooves are formed. The DVD light beam is branched into three beams through the grating grooves, for use for detecting the TES for the optical disc through the DPP method. The branched light beams of the DVD light beam that have passed through the region 5 of the DVD front monitor light-guiding plate 42 reflect from beam splitters 43 and 44, respectively, and proceeds to a front monitor 45 arranged below a reflection mirror (in the negative direction of the z axis in FIG. 8). An output signal indicating the amount of light detected by the front monitor 45 is fed back to a driving circuit (not shown) for the laser diode 40, for use for controlling the amount of light emitted from the laser diode 40 and irradiating the optical disc with a desired amount of light.

The DVD light beam that has passed through the region of the DVD front monitor light-guiding plate 42 with the grating grooves formed therein reflects from the beam splitters 43 and 44 and the reflection mirror 46, and then guided to a collimating lens 47, for conversion into generally parallel light beams. The generally parallel light beams converted from the DVD light beam that have exited the collimating lens 47 are focused on the optical disc (not shown) through an objective lens 48 mounted on an actuator (not shown).

The focused DVD light beam is then reflected from the optical disc, and reaches an optical detector 49 through the objective lens 48, collimating lens 47, reflection mirror 46, beam splitter 44, and beam splitter 43. When the DVD light beam passes through the beam splitter 43, the DVD light beam is given predetermined astigmatism and is used for detecting the FES for the optical disc through the Astigmatic Detection method. In the optical pick-up device 101, the overall optical system is inclined by 45 degrees around a z axis, and the laser chip active layer in the laser diode 40 is made parallel to the plane obtained by rotating the plane formed by the x and y axes in FIG. 8 by 45 degrees counterclockwise with respect to the optical axis, the detecting lens can be eliminated. The DVD light beam guided to the optical detector 49 is used for detection of an information signal recorded on the optical disc and detection of the position control signals such as the TES and the FES for a light spot converged on the optical disc.

Next, the CD optical system will be described. A CD light beam is emitted from a DVD laser diode 40 as diverged lights. A CD laser diode 50 is also assumed to be the semiconductor laser that emits the light beam having a wavelength of approximately 780 nm so as to perform information recording on or information reproduction from a CD. A laser chip active layer in the CD laser diode 50 is assumed to be parallel to a plane obtained by inclining the plane formed by the x and y axes in FIG. 8 by 45 degrees counterclockwise with respect to the optical axis of the CD beam.

The CD light beam emitted from the CD laser diode 50 enters a correcting lens 51. Since the optimum optical magnification factors of the DVD and the CD are different in general, the correction lens 51 is disposed in the CD optical system, for conversion of the substantial focal distance of the collimating lens by a combined use with the collimating lens 47. The optical magnification factor is herein defined to be the ratio of the focal distance of the collimating lens to the focal distance of the objective lens. The CD light beam that has passed through the correcting lens 51 enters a CD front monitor light-guiding plate 52. Since the laser chip active layer is inclined with respect to the optical axis, the CD front monitor light-guiding plate 52 is assumed to have the shape as shown in FIG. 5. In the region different from the region 5, the grating grooves are formed. The CD light beam is branched into three beams through the grating grooves, for use for detecting the TES for the optical disc through the DPP method. The three beams branched from the CD light beam that have passed through the region 5 of the DVD front monitor light-guiding plate 52 pass through the beam splitter 44, and proceeds to the front monitor 45 arranged below the reflection mirror (in the negative direction of the z axis in FIG. 8). An output signal indicating the amount of light detected by the front monitor 45 is fed back to a driving circuit (not shown) for the laser diode 50, for use for controlling the amount of light emitted from the laser diode 50 and irradiating the optical disc with a desired amount of light.

The CD light beam that has passed through the region of the CD front monitor light-guiding plate 52 with the grating grooves formed therein passes through the beam splitter 44. When a diverged light have passed through an inclined parallel plate such as the beam splitter 44, astigmatism and coma aberration occur. The light incident surface of the correcting lens 52 is set to be cylindrical so that the astigmatism and the coma aberration that occur when the CD light beam passes through the beam splitter 44 are removed. After the branched light beams of the CD light beam have passed through the beam splitter 44, the branched light beams reflect from the reflection mirror 46, and then guided to the collimating lens 47, for conversion into generally parallel light beams. The generally parallel light beams emitted from the collimating lens 47 are focused on the optical disc (not shown) through the objective lens 48 mounted on the actuator (not shown).

The focused CD light beam is reflected from the optical disc, and reaches the optical detector 49 through the objective lens 48, collimating lens 47, reflection mirror 46, beam splitter 44, and beam splitter 43. When the CD light beam passes through the beam splitter 43, the CD light beam is given predetermined astigmatism and is used for detecting the FES for the optical disc through the Astigmatic Detection method, like the DVD light beam. The CD light beam guided to the optical detector 49 is used for detection of an information signal recorded on the optical disc and detection of the position control signals such as the TES and the FES for a light spot converged on the optical disc.

As described above, different front monitor light-guiding plates may be disposed for the DVD optical system and the CD optical system, as in FIG. 8. By disposing the different front monitor light-guiding plates, the light incident and emergent surfaces of the regions 5 of the front monitor light-guiding plates can be set at optimum angles, respectively. Thus, it becomes possible to control the powers of the DVD optical disc and the CD optical disc with higher accuracy.

In the sixth embodiment, an optical recording disc system including the optical pick-up device described before will be described.

Figure 9:
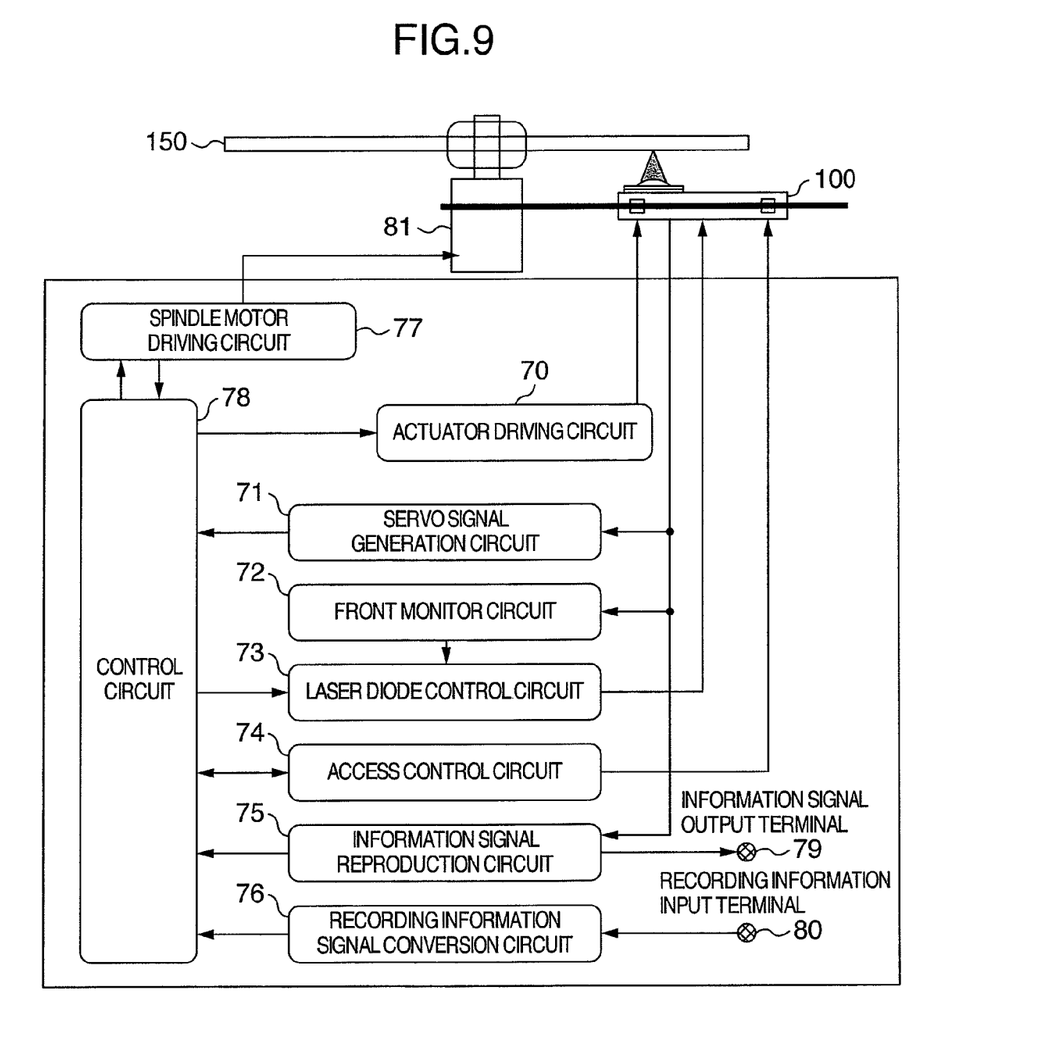
FIG. 9 is a schematic block diagram showing a configuration of an optical recording disc system in a sixth embodiment.

FIG. 9 is a schematic block diagram of an optical recording disc system for recording and reproduction, including the optical pick-up device 100. Signals detected by the optical pick-up device 100 are transmitted to a servo signal generation circuit 71, a front monitor circuit 72, and information signal reproduction circuit 75 in a signal processing circuit. In the servo signal generation circuit 71, the FES and the TES suitable for each optical disc are generated from these detected signals. Based on the TES and the FES, the actuator for the objective lens in the optical pick-up device 100 is driven through an actuator driving circuit 70 to perform position control of the objective lens. The front monitor circuit 72 detects a light amount monitoring signal for the laser diode from the detection signal of the front monitor, and based on this signal, a laser diode control circuit 73 is driven to perform control over the amount of light on an optical disc 150 with accuracy. In the information signal reproduction circuit 75, an information signal recorded on the optical disc 150 is reproduced from the detection signals, and the reproduced information signal is output to an information signal output terminal 79.

When recording information is input to a recording information input terminal 80, the recording information is converted to a recording signal for driving a predetermined laser by a recording information signal conversion circuit 76. This laser driving record signal is transmitted to a control circuit 78 to drive the laser diode control circuit 73, thereby performing light amount control over the laser diode. Then, the recording signal is recorded on the optical disc 150. An access control circuit 74 and a spindle motor driving circuit 77 are connected to this control circuit 78, so that position control over the access direction of the optical pick-up device 100 and rotation control over a spindle motor 81 for the optical disc 150 are performed.

In this sixth embodiment, a description was directed to the optical pick-up device 100 for use in the DVD optical recording disc system alone. The optical recording disc system in the sixth embodiment, however, can also be used for any optical pick-up device that supports an optical disc such as the CD, a BD, or a HD-DVD.

In this sixth embodiment, the description was directed to the optical pick-up device 100 for use in the DVD optical recording disc system alone. In the optical recording disc system in the sixth embodiment, however, an optical pick-up device that supports a plurality of optical discs, such as an optical pick-up device for performing recording on both of the DVD and the CD or a BD/DVD/CD compatible optical pick-up device for performing recording, can also be used.

In the first through sixth embodiments, the grating grooves were formed in the region of the front monitor light-guiding plate except for the region through which the light beam is guided to the front monitor by refraction. The grating grooves may be of course replaced by the surface of a lens.

In the first through sixth embodiments, the region of the front monitor light-guiding plate through which the light beam is guided to the front monitor by refraction is assumed to be a flat surface. The region may of course is curved.

Alternatively, the front monitor light-guiding plate may be formed of a bowl-shaped lens, and the refractive index of the front monitor light-guiding plate may be set freely.

The optical pick-up device according to the first through sixth embodiments of the present invention is compact in size and can be manufactured at low cost. Then, through the use of the optical pick-up device, the sufficient amount of light can be led to the front monitor, and the amount of light irradiated onto the optical disc can be monitored with accuracy, without being affected by the stray light.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

The invention claimed is:

1. An optical pick-up device comprising:
   a laser source enabling emission of at least two light beams with different wavelengths;
   an objective lens which focuses the light beams emitted from the laser source on an optical disc;
   an optical detector which receives a light reflected from the optical disc;
   a front monitor which receives a part of the light beams emitted from the laser source; and
   a front monitor light-guiding plate which guides part of the light beams emitted from the laser source to the front monitor;
   wherein the front monitor light-guiding plate is arranged between the laser source and the objective lens; and
   wherein at least a part of a region of the front monitor light-guiding plate illuminated by the light beams emitted from the laser source has a predetermined shape which causes the light beams to change traveling direction thereof by refraction and then be guided to the front monitor.

2. The optical pick-up device according to claim 1, wherein the part of the region of the front monitor light-guiding plate is provided in correspondence with each of the wavelengths of the light beams.

3. The optical pick-up device according to claim 1, wherein at least the part of the region of the front monitor light-guiding plate is illuminated by the light beams outside of an effective diameter of the objective lens.

4. The optical pick-up device according to claim 3, wherein at least the part of the region of the front monitor light-guiding plate crosses a straight line passing through a center of the light beams to be received by the front monitor and perpendicular to an active layer in a laser chip in the laser source.

5. The optical pick-up device according to claim 1, wherein grating grooves are formed in another region of the front monitor light-guiding plate which is different from the part of the region having the predetermined shape.

6. The optical pick-up device according to claim 5, wherein the another region of the front monitor light-guiding plate different from the part of the region having the predetermined shape is curved.

7. An optical recording disc system including the optical pick-up device according to claim 1, and a laser source control circuit for controlling an amount of light emitted from the laser source by using a signal output from the front monitor of the optical pickup device.

* * * * *